Patented Sept. 27, 1938

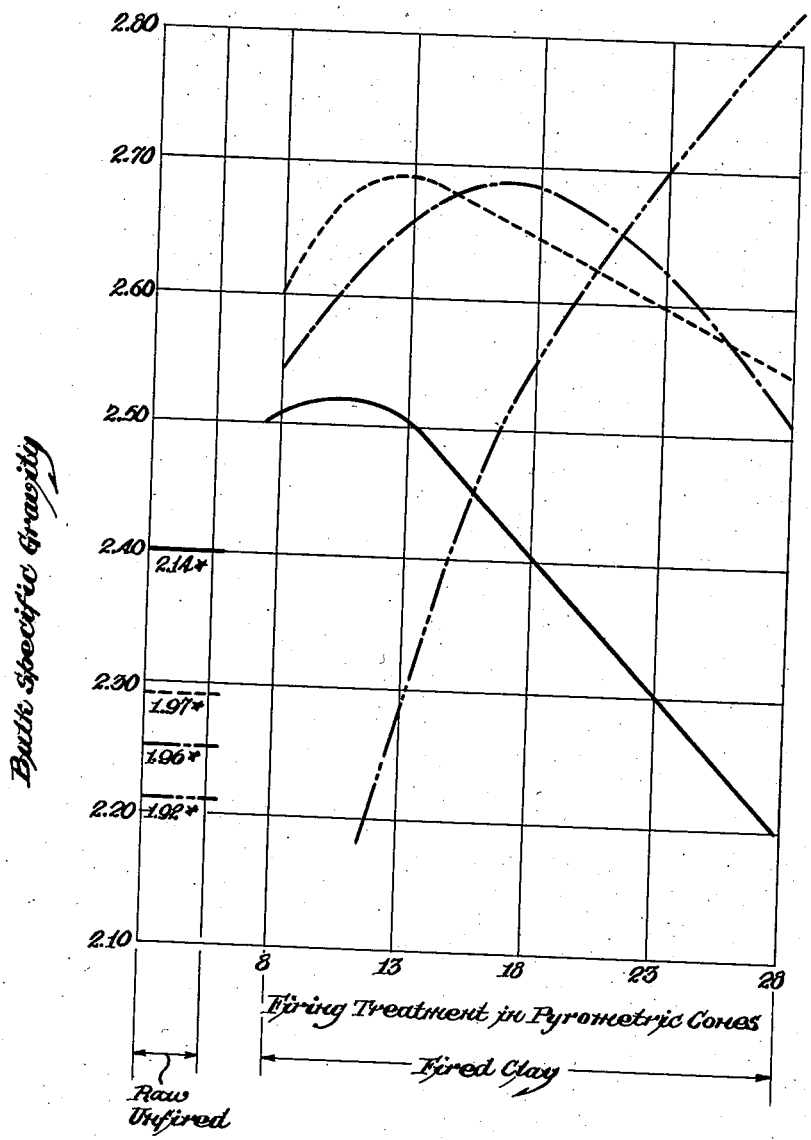

2,131,252

UNITED STATES PATENT OFFICE 2,131,252

METHOD OF MAKING FLINT CLAY BRICK

Russell P. Heuer, Bryn Mawr, and Alex Edward Fitzgerald, Merion, Pa., assignors to General Refractories Company, Philadelphia, Pa., a corporation of Pennsylvania Application April 3, 1937, Serial No. 134,828

5 Claims. (Cl. 25—156)

The present invention relates to dense refractory brick made from hard flint clay and to methods of producing such brick.

A purpose of the invention is to produce flint clay brick of higher refractoriness, bulk specific gravity and cold crushing strength, and lower reheat shrinkage, spalling loss and manufacturing loss than the flint clay brick of the prior art, securing some or all of the following properties: an alumina content in the finished brick in excess of 42% (a measure of refractoriness), a bulk specific gravity in excess of 2.38, a cold crushing strength above 1200 pounds per square inch (84.4 kilograms per square centimeter), a linear change when reheated at 1600° C. (2912° F.) of not more than 1%, a spalling loss after having been preheated to 1650° C. (3002° F.) of not more than 1%, a linear firing shrinkage of less than 9% and a manufacturing loss of less than 10%.

A further purpose is to produce a higher quality flint clay brick notwithstanding the inevitable high shrinkage which takes place in kiln firing.

A further purpose is to mix raw hard flint clay, having an alumina content of 35% to 45%, with 2% to 5%, preferably 3%, of bentonite or similar highly colloidal clay and substantially no calcined flint clay or grog (certainly less than 5%), to employ between 30% and 70% of particles between 3 and 28 Tyler standard mesh per linear inch (1.4 and 118.4 mesh per square centimeter) and between 70% and 30% of particles below 48 Tyler standard mesh per linear inch (357.1 mesh per square centimeter), to prepare the mix on a special pan, to mold with a molding efficiency in excess of 90% and to fire at a minimum temperature of one pyrometric cone below the temperature producing maximum bulk specific gravity when firing lumps of the particular flint clay.

A further purpose is to fire low burning Missouri hard flint clay at one maturing temperature and to fire high burning Missouri hard flint clay at another and higher maturing temperature.

Further purposes appear in the specification and in the claims.

The figure shows curves useful in explaining the invention.

In the past efforts have been made to produce flint clay brick of improved properties from hard flint clay. Holmes and Paul, Journal of the American Ceramic Society (1931) 755 to 763, by starting with hard flint clay from the Missouri diaspore field, bonding with bentonite, using no grog, and firing at about cone 16, obtained brick which were unsatisfactory from the standpoint of reheating shrinkage and apparently other properties.

The present inventors have studied the problem of improving the properties of flint clay brick, and have succeeded in obtaining flint clay brick of very satisfactory properties by using a somewhat different procedure from that employed by Holmes and Paul, and in some cases employing a different raw material.

The present invention is the result of an investigation made of the properties of clays of the Missouri field. The invention is of course applicable to other clays. In this field there are soft or semi-hard clays, hard flint clays and diasporitic clays. The refractoriness of the clay, the firing shrinkage of the clay when molded into brick and the required firing treatment to minimize shrinkage during service are primary considerations in the selection of a satisfactory clay.

The present inventors have discovered that there are two distinct types of hard flint clays which necessitate distinctly different firing treatments as later explained.

Some of the properties of the various clays will be considered briefly.

Hardness

The soft or semi-hard clays exhibit the following hardness as indicated by the disintegration of the particles by washing:

|  | Screen analysis in percentage | |
|---|---|---|
|  | Before washing | After washing |
| On Tyler standard 3 mesh per linear inch screen | 0 | 0 |
| On Tyler standard 6 mesh per linear inch screen | 97 | Trace. |

The particle hardness of the hard flint clays is as follows:

|  | Screen analysis in percentage | |
|---|---|---|
|  | Before washing | After washing |
| On Tyler standard 3 mesh per linear inch screen | 0 | 0 |
| On Tyler standard 6 mesh per linear inch screen | 92 to 97 | 60 to 90 |

It is evident that the hardness of the flint clays is markedly superior to that of the soft or semi-hard clays.

Refractoriness

Refractoriness in clay is known to increase as the alumina content increases and as the fluxes such as iron oxide and alkalis decrease. Typical percentage analyses of the various raw clays before burning are as follows:

|  | Soft or semi-hard clay | Hard flint clay | | Diasporitic clay |
| --- | --- | --- | --- | --- |
|  |  | Low burning | High burning |  |
| Ignition loss | 10 to 12 | 12 to 14 | 12 to 14 | 12.5 to 14 |
| Alumina | 30 to 35 | 35 to 45 | 35 to 45 | 63 to 78 |
| Iron oxide | 0.9 to 1.8 | 0.3 to 0.9 | 0.3 to 0.9 | 0.4 to 1.2 |
| Alkalies | 0.8 to 2.1 | 0.5 to 1.1 | 0.5 to 1.1 | 0.7 to 1.8 |

The fusion point of soft or semi-hard clay is about cone 32 (3092° F., 1700° C.), while the fusion point of hard flint clay, whether high burning or low burning, is about cone 34 (3200° F., 1760° C.). The fusion point of diasporitic clay is about cone 38 (3335° F., 1835° C.).

It is obvious from the above that diasporitic clay is more refractory than either type of hard flint clay, and that hard flint clay is more refractory than soft or semi-hard clay.

Firing shrinkage

Information as to firing shrinkage may be obtained from the drawing which shows curves for the firing characteristics of soft or semi-hard clay, low burning and high burning flint clay and diasporitic clay. In the curves, the ordinates are bulk specific gravity and the abscissae are firing treatment in pyrometric cones.

These data for plotting the curves were obtained by determining the bulk specific gravities of lumps of the various clays which were fired or calcined at the various temperatures indicated by the abscissae. The firing up to cone 20 was carried on in the commercial kilns regularly used for burning fire brick, while the firing at temperatures above cone 20 was carried on in laboratory furnaces.

The procedure by which these bulk specific gravities are obtained is as follows:

Several lumps of the clay in question are placed in a kiln or furnace along with standard pyrometric cones (The Edward Orton, Jr. Ceramic Foundation) and fired, the cone of the burn being noted. These lumps are crushed and pieces passing 6 Tyler standard mesh per linear inch but remaining on 8 Tyler standard mesh per linear inch are selected for testing. These are dried to constant weight and their weight (M) is noted. Then they are boiled in water for one hour. After boiling the water is decanted and the pieces are freed of surface water by rubbing them around lightly with the fingers on a 10 Tyler standard mesh per linear inch screen which rests on a dry cotton towel until the surface water is removed. When properly treated the pieces no longer adhere to each other. These pieces now free of surface water are then put in a graduated burette partially filled with water and the volume of water (V) which is displaced is determined. The bulk specific gravity of the pieces under examination is obtained by the formula:

$$\text{Bulk specific gravity} = \frac{M}{V}$$

This method is accurate to within 2%.

By firing various samples of the clay in question at various cones and determining the bulk specific gravity developed at each temperature, a curve can be drawn and the temperature at which the clay attains maximum bulk specific gravity determined.

At the extreme left of the figure, the bulk specific gravities of the clays as they come from the mine are indicated, along with the corresponding bulk specific gravities on a dehydrated basis.

From the curves it is possible to determine the amount of shrinkage which will occur when a given raw clay is fired sufficiently to remove all shrinkage. If we consider soft or semi-hard clay having a bulk specific gravity as mined of 2.40 and containing 11% of chemically combined water removed during firing, the bulk specific gravity on a dehydrated basis is 2.40−(11% of 2.40)=2.14. From the curve for firing soft or semi-hard clay, it is seen that the maximum bulk specific gravity attained is 2.52. The increase in bulk specific gravity due to firing, 2.52−2.14, represents a volume shrinkage of 15% or a linear shrinkage of about 5%, within the safe range of commercial practice. At the present time some soft or semi-hard clay mixes which exhibit linear firing shrinkages of about 7% are manufactured into brick.

Calculating on the same basis, the hard flint clay of either the low burning or high burning type contains about 13% of chemically combined water and has a bulk specific gravity on the dehydrated basis of 1.97 or 1.96. The maximum bulk specific gravity attained by firing is 2.69 and the linear shrinkage is about 9%. Although this is a high linear shrinkage, compared to standard practice, it is within the range of commercial possibility.

Applying similar considerations to the diasporitic clay, it is found that the linear firing shrinkage is above 11%, beyond any figure obtained for clays commercially handled.

In summary, therefore, it would appear that, judging by firing shrinkages, the soft or semi-hard clay is entirely satisfactory, the low burning and high burning hard flint clays are high but within the range of commercial possibility and the diasporitic clay is entirely beyond the range of possibility.

Firing treatment

The curves in the figure throw considerable light on the firing treatment which may be successfully employed with the various clays. The curve for soft or semi-hard clay (in solid line) indicates that the maximum specific gravity and hence freedom from shrinkage are obtained by firing at about cone 11. In the case of the low burning hard flint clay (plotted in dotted line), the maximum specific gravity is reached by firing at about cone 12 or 13. For the high burning hard flint clay (plotted in dash-and-single-dotted line) the maximum specific gravity is attained at cone 17. The diasporitic clay (plotted in dash-and-double-dotted line) must be heated to at least cone 28 to attain a volume-stable condition.

The difference in firing characteristics between the low burning and high burning hard flint clays is an interesting discovery of the present inventors. The cause is not apparent, as the low burning and high burning hard flint clays have substantially the same chemical analyses even down to the minor constituents, the colloidal characters do not seem to differ and the change in screen analyses upon washing are virtually identical. The differences in proper firing treatments are so marked, however, that a firing treatment which would be proper for low burning hard flint clay proves to be entirely unsatisfactory for high burning hard flint clay, while the firing treatment for the high burning hard flint clay is unnecessary and an economic waste if applied to the low burning hard flint clay.

Of the clays just discussed, the hard flint clays are the only ones which may be commercially employed as a major component in mixes used for the production of dense bricks of high refractoriness. The soft or semi-hard clays lack the refractoriness required if they are to be used in excess of 30% in the brick mixes and the diasporitic clays shrink excessively and cannot be fired to the necessary density in the present commercial equipment.

The investigations of the present inventors indicate that the hard flint clays not only possess the required refractoriness, but that the firing shrinkage may be satisfactorily coped with, and the clays may be rendered volume-stable by the proper firing treatment. To manufacture a satisfactory brick from such hard flint clays, it is important to take special precautions regarding bonding, grain sizing, mix preparation and molding, as well as firing.

After the hard flint clay is mined, it should be ground and classified according to grain size and a mix prepared containing large particles and small particles, with a relatively small proportion and preferably an entire absence of intermediate sized particles. The larger particles should be between 3 and 28 Tyler standard mesh per linear inch (1.4 and 118.4 mesh per square centimeter) and the smaller particles should be below 48 Tyler standard mesh per linear inch (357.1 mesh per square centimeter). The proportions of larger and smaller particles should be from 30% to 70% of larger particles and from 70% to 30% of smaller particles.

The quantity of particles between 28 and 48 Tyler standard mesh per linear inch (118.4 and 357.1 mesh per square centimeter) should be less than 25%, and preferably the intermediate particles should be entirely omitted so that the preferable mix will comprise 50% of larger particles and 50% of smaller particles.

The failure to grade the particles according to size, even though all other steps in the process are carried out correctly, will result in low bulk density of the finished brick, for example 2.28, low cold crushing strength, high reheat shrinkage, for example about 2%, and high manufacturing loss.

The hard flint clay is quite nonplastic. Failure to add a bond results in low cold crushing strength and high manufacturing loss. On the other hand, use of any considerable quantity of bond produces in the brick undesirable characteristics previously discussed in connection with soft or semi-hard clay, such as lack of refractoriness, low bulk density and high spalling loss. The experiments of the present inventors indicate that the brick may be bonded satisfactorily by adding from 2% to 5% of bentonite or similar material, the preferable quantity being about 3%.

As materials similar to bentonite, ehrenbergite, montmorillonite, damorterolite and bidellite are recognized. All are characterized by very fine grain, very high colloid content and high water absorption as compared with ordinary plastic or bond clays. Wherever bentonite is mentioned in the claims, it will be understood that these and other equivalents are included.

The presence of calcined clay or grog in the mix is very undesirable as it causes low bulk density, low cold crushing strength, high reheat shrinkage and high spalling loss. The brick containing a substantial quantity of calcined clay mixed with raw clay develops cracks on reheating. In order to avoid these undesirable characteristics, it is preferred to eliminate the calcined clay entirely, and in any case the quantity of calcined clay in the mix should be 5% or less. It will thus be evident that the preferable mix will comprise 98% to 95% of hard flint clay and 2% to 5% of bentonite, with between 30% and 70% of larger particles between 3 and 28 Tyler standard mesh per linear inch (1.4 and 118.4 mesh per square centimeter) and between 70% and 30% of smaller particles through 48 Tyler standard mesh per linear inch (357.1 mesh per square centimeter).

The mix of properly sized hard flint clay particles and bentonite, in the proper proportions and with the proper amount of water, should be prepared so as to obtain uniform distribution of bentonite over the surfaces of the hard flint clay particles. The ordinary batching does not produce the most desirable uniformity of batch and accordingly it is strongly recommended that a special pan or mixer such as the Simpson, Lancaster or Clearfield mixer be used (see for example Eirich and Eirich United States Patents Nos. 1,663,830; 1,728,598 and 1,737,301).

Poor batching may result in low bulk density. For example, where all other conditions were the same, hard flint clay brick whose mix was prepared on a special pan had a bulk specific gravity of about 2.34 in the finished brick, while said brick whose mix was prepared on a regular pan had a bulk specific gravity of about 2.29.

Poor batching or poor wetting may likewise result in low cold crushing strength, and the production of soft or punky brick. Poor batching may also result in high reheat shrinkage and high manufacturing loss. Other manufacturing conditions remaining the same, it was found that the manufacturing loss was reduced in one case from 62%, where the mix was prepared in a so-called regular way, to 22% where it was prepared in a special pan, and in another case from 32% where the mix was prepared in a regular pan to 6% where it was prepared in a special pan. It is thus evident that in manufacturing brick from hard flint clay, the employment of a special pan has decided advantages.

The molding or pressing of the brick should be conducted with a pressing efficiency in excess of 90%. By pressing efficiency is meant the ratio on a percentage basis of the bulk specific gravity of the green dry brick to the bulk specific gravity of the dry raw mix, the latter being calculated from the bulk specific gravity of the dry ingredients and their proportion by weight in the mix. To obtain such high pressing efficiencies it is ordinarily necessary to employ pressures in excess of 1000 pounds per square inch (70.3 kilograms per square centimeter) and preferably in excess of 5000 pounds per square inch (351.5 kilograms per square centimeter). It will be understood that it is preferable to use the pressing efficiency rather than the pressure as the guide for pressing, as slight differences in the raw material or in the mix preparation change the pressure requirements.

Pressing efficiency below 90% will result in low bulk specific gravity. For example a hand-molded brick prepared and fired according to the disclosure of the present invention had a bulk specific gravity for the green dry brick of only 1.97 and for the fired brick of only 2.28. Likewise low cold crushing strength, high reheat shrinkage and high manufacturing loss result from low pressing efficiency.

The brick of the present invention, after molding, are dried and then fired in a commercial kiln. For best results the brick when set in the kiln should rest on a material having firing shrinkage approximately equal to that of the brick. This is accomplished by eliminating the use of previously burned brick in the setting and making the setting entirely of brick having the high firing shrinkage. The spacing between bricks set in the same area in the kiln should be uniform. The gas velocity through the spaces between the bricks should preferably be the same throughout the kiln. The spacing may thus vary for different parts of the kiln. For example in some places the space may be ½ inch, in others more or less than ½ inch. The firing temperature is quite important as the use of too low a firing temperature may seriously impair or destroy the quality of the brick. As already explained, the two types of hard flint clay require distinctly different firing treatments.

The low burning type which is found most usually in the "clay fields" of Missouri should be fired at con 12, 13 or 14 (that is, between cones 12 and 14), while the high burning type which is found chiefly in the diaspore fields of Missouri, though also present in some of the clay fields, should be fired at cone 16, 17 or 18 (that is, between cones 16 and 18). It is therefore necessary to identify the particular clay. This is preferably done by subjecting coarse lumps of the material to firing treatment at various temperatures, determining the bulk specific gravities after such treatment.

In the work of Holmes and Paul, referred to above, no distinction was drawn between the high burning and low burning clays, and it is impossible to state with assurance which type was employed. The unsatisfactory results obtained may be attributable entirely to improper sizing, preparation and molding, although it seems likely that improper firing treatment was also a factor.

The temperature chosen for firing should be a minimum of one pyrometric cone below the temperature at which the particular hard flint clay attains its maximum bulk specific gravity.

Improper firing treatment results in low bulk specific gravity, as obvious from the curves, low cold crushing strength and high reheat shrinkage.

The hard flint clay brick produced in accordance with the present invention show a number of distinctly desirable properties. The alumina content of the finished brick is in excess of 42%, thus indicating that the brick is quite refractory.

The bulk specific gravity is in excess of 2.38. The bulk specific gravity of the fired brick is in excess of 85% (preferably 90%) of the maximum bulk specific gravity attained by the calcined hard flint clay as shown by the appropriate curve.

The brick exhibits a cold crushing strength, when determined by crushing a 9 x 4½ x 2½ inch brick on the 4½ x 2½ inch faces, in excess of 1200 pounds per square inch (84.4 kilograms per square centimeter) and in the great majority of cases in excess of 1550 pounds per square inch (109 kilograms per square centimeter).

The linear shrinkage of the brick after reheating at 1600° C. (2912° F.) for five hours is not more than 1% and in most cases less than 0.75%. This is to be compared with the linear reheat shrinkage of 2.1% obtained by Holmes and Paul at 2800° F. (1538° C.).

The spalling loss after preheating to 1650° C. (about 3000° F.) is less than 1% in the brick of the present invention.

The brick of the present invention exhibits a linear firing shrinkage of less than 9% in the ordinary case.

The manufacturing loss obtained in practicing the present invention is less than about 10%, which is a very favorable figure compared to usual flint clay brick operations.

The above combination of properties makes the brick of the present invention entirely commercial and definitely superior to brick of the prior art manufactured from raw hard flint clay or mixtures of raw and calcined hard flint clay.

Wherever percentages are mentioned in the present application, it will be understood that they are percentages by weight based upon the total dry ingredients or upon the dry brick, unless it is clearly indicated otherwise.

Wherever screen sizes are mentioned it is understood that W. S. Tyler Standard Testing Sieves are meant. These screens have the following characteristics:

| Mesh | Opening | | Diameter of wire | |
|---|---|---|---|---|
| | Inches | Millimeters | Inches | Millimeters |
| 3 | 0.263 | 6.680 | 0.070 | 1.776 |
| 6 | 0.131 | 3.327 | 0.036 | 0.913 |
| 8 | 0.093 | 2.362 | 0.032 | 0.811 |
| 28 | 0.0232 | 0.589 | 0.0125 | 0.316 |
| 48 | 0.0116 | 0.295 | 0.0092 | 0.233 |

Whenever reference is made to linear change of brick after reheating at 1600° C. (2912° F.), it is understood that the brick has been tested in accordance with the standard test procedure described in American Society for Testing Materials, Standard C–113–36, schedule "C," as it appears in A. S. T. M. Standards (1936) Part II, Non-Metallic Materials, pages 222–223 inclusive.

Whenever reference is made to spalling loss of brick after preheating at 1650° C. (3002° F.) it is understood that the brick has been tested in accordance with the tentative standard procedure described in American Society for Testing Materials, Standard C–122–36T as it appears in A. S. T. M. Tentative Standards (1936) pages 457–458 inclusive.

It will be evident that it is quite important, in practicing the present invention, to determine the firing properties of the particular hard flint clay before attempting to manufacture it into brick. In making the brick, calcined clay material should be eliminated or kept below 5%, the hard flint clay should be sized and combined as already explained and bonded with 2% to 5% of bentonite. The mix should then preferably be prepared in a special pan. The molding efficiency should be in excess of 90% and the firing should be done at a minimum temperature of one pyrometric cone below the temperature producing the maximum bulk specific gravity of the hard flint clay as indicated by firing tests. As an indication of satisfactory firing, the bulk specific gravity of the fired brick should be in excess of 85% (preferably 90%) of the maximum bulk specific gravity of the calcined hard flint clay.

In view of our invention and disclosure variations and modifications to meet individual whim or particular need will doubtless become evident to others skilled in the art, to obtain all or part of the benefits of our invention without copying the method or composition disclosed, and we, therefore, claim all in so far as they fall within the reasonable spirit and scope of our invention.

Having thus described our invention, what we claim as new and desire to secure by Letters Patent is:

1. The process of producing dense refractory flint clay brick, which comprises preparing a mix of between 30% and 70% of hard flint clay particles from 3 to 28 mesh per linear inch, between 70% and 30% of hard flint clay particles below 48 mesh per linear inch and between 2% and 5% of bentonite, the flint clay containing between 35% and 45% of alumina and including not more than 5% of calcined clay material, molding the mix into brick under a molding efficiency above 90% and firing the brick at a minimum temperature of one pyrometric cone below the temperature producing maximum bulk specific gravity when firing lumps of the particular flint clay, the burned brick when reheated at 1600° C. for five hours showing a linear shrinkage not more than one percent.

2. The process of producing dense refractory flint clay brick, which comprises preparing a mix of between 30% and 70% of hard flint clay particles from 3 to 28 mesh per linear inch, between 70% and 30% of hard flint clay particles below 48 mesh per linear inch and between 2% and 5% of bentonite, the flint clay containing between 35% and 45% of alumina and including not more than 5% of calcined material, molding the mix into brick under a molding efficiency above 90% and firing the brick at a temperature producing a bulk specific gravity of the fired brick above 85% of the maximum bulk specific gravity of fired lumps of the flint clay.

3. The process of producing dense refractory flint clay brick from high burning hard Missouri flint clay, which comprises preparing a mix of between 30% and 70% of high burning hard Missouri flint clay particles from 3 to 28 mesh per linear inch, between 70% and 30% of high burning hard Missouri flint clay particles below 48 mesh per linear inch and between 2% and 5% of bentonite, the flint clay containing between 35% and 45% of alumina and including not more than 5% of calcined clay material, molding the mix into brick under a molding efficiency above 90% and firing the brick at a temperature between pyrometric cones 16 and 18, the burned brick when reheated at 1600° C. for five hours showing a linear shrinkage of not more than one per cent.

4. The process of producing dense refractory flint clay brick from low burning hard Missouri flint clay, which comprises preparing on a special pan a mix of between 30% and 70% of low burning hard Missouri flint clay particles from 3 to 28 mesh per linear inch, between 70% and 30% of low burning hard Missouri flint clay particles below 48 mesh per linear inch and between 2% and 5% of bentonite, the flint clay containing between 35% and 45% of alumina and including not more than 5% of calcined clay material, molding the mix into brick under a molding efficiency above 90% and firing the brick at a temperature between pyrometric cones 12 and 14, the burned brick when reheated at 1600° C. for five hours showing a linear shrinkage of not more than one per cent.

5. The process of producing dense refractory flint clay brick which comprises preparing a mix of clay particles including more than 70% of hard flint clay particles with between 2% and 5% of bentonite, the clay particles containing not more than 5% of calcined clay material, molding the mix into brick under a pressure in excess of 1,000 pounds per square inch and firing the brick to a temperature high enough to produce a brick which when reheated at 1600° C. for five hours shows a linear change not more than one per cent.

RUSSELL P. HEUER.
ALEX EDWARD FITZGERALD.